United States Patent [19]
Jensen

[11] Patent Number: 5,827,249
[45] Date of Patent: Oct. 27, 1998

[54] EXTERNAL URINARY CATHETER AND A HOSE CONNECTOR FOR CONNECTION THEREWITH

[75] Inventor: Thomas Dam Jensen, Helsingør, Denmark

[73] Assignee: Coloplast A/S, Denmark

[21] Appl. No.: 765,073

[22] PCT Filed: Jun. 12, 1995

[86] PCT No.: PCT/DK95/00234

§ 371 Date: Dec. 27, 1996

§ 102(e) Date: Dec. 27, 1996

[87] PCT Pub. No.: WO96/00541

PCT Pub. Date: Jan. 11, 1996

[30] Foreign Application Priority Data

Jun. 29, 1994 [DK] Denmark ............................ 0774/94

[51] Int. Cl.⁶ .................................................. A61F 5/44
[52] U.S. Cl. ............................................ 604/349; 604/327
[58] Field of Search ................................. 604/327, 328, 604/329, 349–352

[56] References Cited

U.S. PATENT DOCUMENTS

| 3,835,857 | 9/1974 | Rogers, III et al. . |
| 4,280,498 | 7/1981 | Jensen . |

FOREIGN PATENT DOCUMENTS

| 267917 | 8/1988 | European Pat. Off. . |
| 528965 | 3/1994 | European Pat. Off. . |
| 2618718 | 11/1986 | Germany . |
| 91 17728 | 11/1991 | WIPO . |

*Primary Examiner*—Robert A. Clarke
*Attorney, Agent, or Firm*—Ostrolenk, Faber, Gerb & Soffen, LLP

[57] ABSTRACT

An external catheter comprises a sheath essentially formed as a shaft and a constricted drainage tube part integrated therewith for connection with a hose connector which is connected to a draining hose. In order to facilitate the mounting of the drainage tube part on the hose connector, an end portion of the drainage tube part at the orifice thereof is divided into at least two sections.

9 Claims, 4 Drawing Sheets

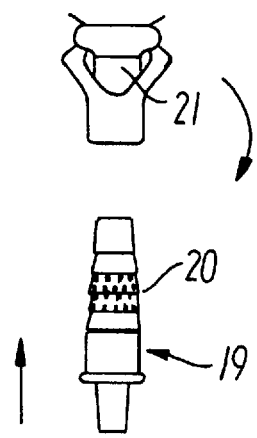
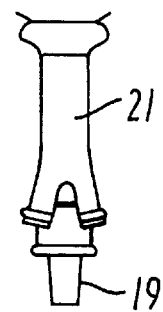
FIG. 9    FIG. 10
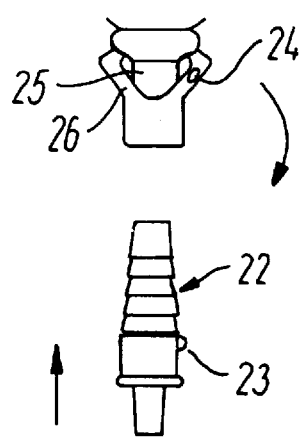
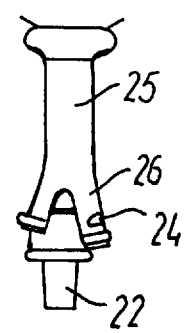
FIG. 11   FIG. 12

EXTERNAL URINARY CATHETER AND A HOSE CONNECTOR FOR CONNECTION THEREWITH

This case was filed under 35 U.S.C. § 371 claiming priority based on PCT/DK95/00234 filed Jun. 12, 1995.

BACKGROUND OF THE INVENTION

The invention relates to an external catheter for remedying male urinary incontinence, comprising a sheath essentially formed as a shaft and a constricted drainage tube part integrated therewith for connection with a hose connector which is connected to a draining hose.

An external catheter of this type is known eg. from EP patent no. 0 528 965. In this design, the catheter is of a thermoplastic material where, as described in said patent, the drainige tube part may be produced by injection moulding whereas the thin-walled sheath formed as a shaft is produced by a combined pull extrusion and blow moulding process made in connection with this injection moulding. Thereby is obtained among other an advantageous degree of freedom for the design of the drainage tube part, eg. for its adaptation to specially designed hose connectors or for optimalization to special applications.

In the design of external catheters or uridoms, great importance is generally attached to obtaining a good user comfort in connection with mounting, including especially the placing of the catheter sheath on the penis which must often be carried out by the nursing staff, in particular in cases with older or handicapped patients having reduced finger motor function.

However, it has been neglected to some extent that the mounting also requires connection of the drainage tube part to the drainage hose connected with a collection bag. This connection is generally made by means of a hose connector designed as a short tube section with end portions designed for sealed connection with the drainage hose and the drainage tube part of the catheter, respectively.

In order to obtain the required sealing in the connection between the drainage tube part and special designs of hose connectors, it has in the above EP patent been proposed to design the drainige tube part with an inward or outward projecting collar member at its orifice. However, this has not to any appreciable extent improved the user comfort just as these special designs are not appropriate for connection to standard hose connectors which are typically formed with a conventional corrugated end portion for connection of the drainage tube part.

Therefore, the object of the invention is to procure a new design of the drainage tube part of the catheter with a considerably improved user friendliness when mounting.

DESCRIPTION OF THE INVENTION

In a catheter of the above type, this is according to invention achieved in the way that an end portion of the drainage tube part at the orifice thereof is divided into at least two sections, said sections forming partly cylindrical sections of the wall of the drainage tube part and being separated by means of slits mainly parallel to the axis of the drainage tube part.

The said sections forming a number of separate flaps with a length which is somewhat shorter than the corresponding end portion of the hose connector, the mounting is facilitated to a considerable extent because these flaps may be pulled in over the end portion of the hose connector ore at a time whereby lesser force is required for the mounting compared to the usually executed manipulation where the drainage tube part is pushed in over the end portion of the hose connector.

Even users with reduced finger motor function may thus as a rule perform the mounting by themselves. This is further facilitated in the way that said sections form partly cylindrical sections of the wall of the drainage tube part and are separated by means of slits mainly parallel to the axis of the drainage tube part.

As another possibility according to a further development of the invention, the said sections of the drainage tube part may, in supply condition, be rolled back over it. Such a rolled-back drainage tube part may be drawn a small distance in over the end portion of the hose connector whereupon the separate wall sections or flaps are pulled individually over the end portion of the hose connector.

In order to counteract a risk of the engagement becoming too loose such that the hose connector is liable to be pulled out of the drainage tube part, a loose, axially movable tension ring, eg. an O-ring, may according to an appropriate embodiment be positioned on the drainage tube part.

Other advantageous embodiments will appear from the description.

The catheter according to the invention may appropriately be produced from a thermoplastic material as it is known from above EP patent, but may also be produced by conventional latex technology as it is known eg. from EP patent no. 390720, whereby division of the lower portion of the drainage tube part in said sections is made by an additional treatment.

As indicated above, the invention also relates to a hose connector for connection of an external catheter with a draining hose. In order to reduce a risk of separation from the drainage tube part of the catheter, such a hose connector according to the invention is characterized in that it is provided with one or more essentially punctual engagement members for engagement with the inside of the drainage tube part of the catheter.

In the following, the invention will be further explained under reference to the schematical drawing which merely shows the parts of a uridom and a hose connector in standard design which are necessary for the understanding of the invention, FIGS. 1–16 showing a number of different embodiments for each of which the drainage tube part of the catheter and hose connector are shown partly separated partly assembled.

BRIEF DESCRIPTION OF THE INVENTION

FIG. 9 shows a fifth embodiment in which the uridome and hose are separated.

FIG. 10 shows the fifth embodiment in which the uridome and hose are connected.

FIG. 11 shows a sixth embodiment in which the uridome and hose are separated.

FIG. 12 shows the sixth embodiment in which the uridome and hose are connected.

Figure 1:
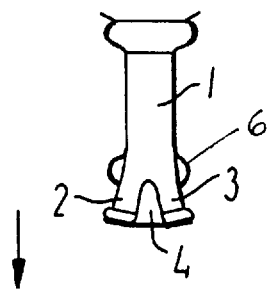
FIG. 1 shows a first embodiment in which the uridome and hose are separated.
Figure 1:
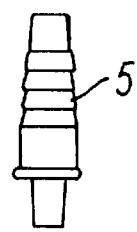
Figure 2:
FIG. 2 shows the first embodiment in which the uridome and hose are connected.

In the embodiment in FIGS. 1 and 2, the drainage tube part 1 of the catheter, whose other parts are not shown, is in accordance with the invention divided into two sections which may appropriately be formed as mainly semi-cylindrical wall sections or flaps 2 and 3 separated by relatively short slits 4 mainly parallel to the axis. In order to ease the handling, each of the sections or the flaps 2, 3 may be provided with a gripping flange 6. is When mounting this drainage tube part 1 on the hose connector 5, the usually corrugated engagement member of said hose connector may relatively easily be guided a short distance into the drainage tube part 1 corresponding to the relatively short length of the slits 4 whereupon the drainage tube part 1 with considerably reduced force may easily be pulled completely in over the corrugated end portion of the connector by pulling the flaps 2, 3 individually.

Figure 3:
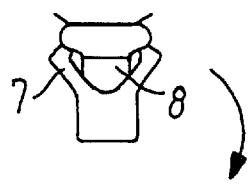
FIG. 3 shows a second embodiment in which the uridome and hose are separated.
Figure 3:
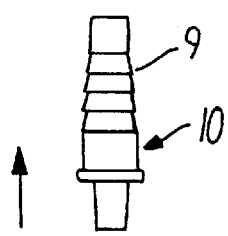
Figure 4:
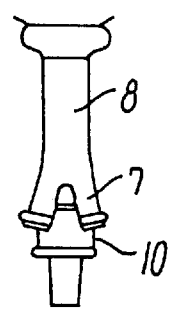
FIG. 4 shows the second embodiment in which the uridome and hose are connected.

In the embodiment in FIGS. 3 and 4, the semi-cylindrical wall sections or flaps 7, of which there might be more than two, are rolled back over the drainage tube part 8.

When mounting, the end portion 9 of the hose connector 10 is guided a short distance into to the rolled-back drainage tube part 8, whereupon the flaps 7 are rolled back over the end portion 9 of the hose connector.

Figure 5:
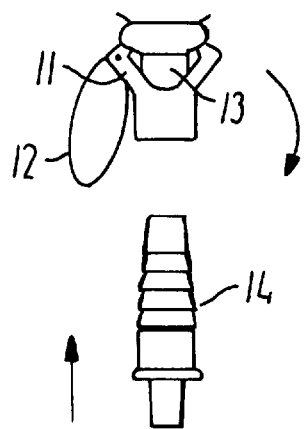
FIG. 5 shows a third embodiment in which the uridome and hose are separated.
Figure 6:
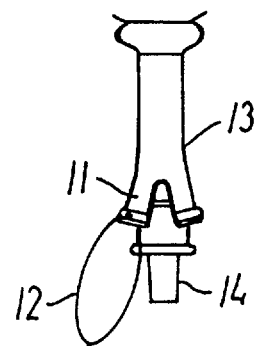
FIG. 6 shows the third embodiment in which the uridome and hose are connected.

For further facilitation of this operation, one of the wall sections or flaps 11 may, as shown in FIGS. 5 and 6, be connected with a draw cord 12 which also entails an alleviation when dismounting the drainage tube part 13 from the hose connector 14.

Figure 7:
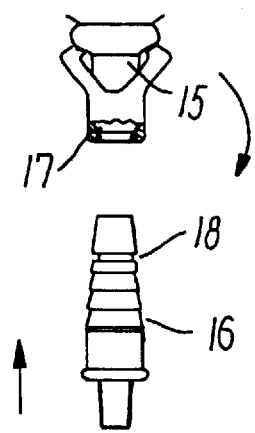
FIG. 7 shows a fourth embodiment in which the uridome and hose are separated.
Figure 8:
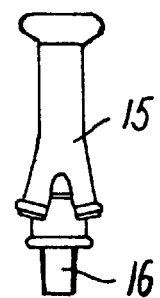
FIG. 8 shows the fourth embodiment in which the uridome and hose are connected.

In order to counteract a risk of separation of the drainage tube part 15 and the hose connector 16 as a consequence of reduced pull-off power, the drainage tube part and the hose connector may be designed with different forms of mutually engaging members, eg. as shown in FIGS. 7 and 8, an internal bead 17 in the drainage tube part for engagement with a slot 18 on the connector in principle corresponding to the design known from aforesaid EP patent with an inward projecting collar member at the orifice of the drainage tube part.

As another possibility, the connector 19 may, as shown in FIGS. 9 and 10, on its external face be provided with projections 20 increasing the friction against the inside of the drainage tube part 21.

The pull-off power may likewise be increased if the connector 22, as shown in FIGS. 11 and 12, is provided with a pin 23 which may move into engagement with a hole 24 in one of the flaps or wall sections 26 of the drainage tube part 25.

Figure 13:
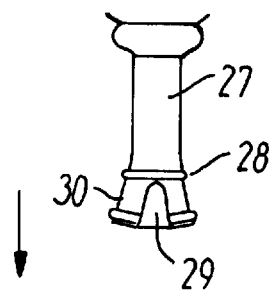
FIG. 13 shows a seventh embodiment in which the uridome and hose are separated.
Figure 13:
Figure 14:
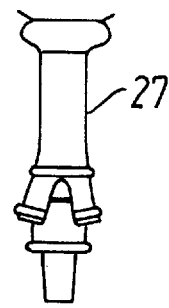
FIG. 14 shows the seventh embodiment in which the uridome and hose are connected.

As a further possibility, the drainage tube part 27 may, as shown in FIGS. 13 and 14, be designed with an outward bead 28 just above the end of the slits 29 separating the flaps 30. Such a bead may further serve as a pushing ring for users who may want to make the mounting by means of a usual push movement.

Figure 15:
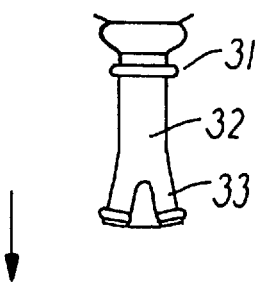
FIG. 15 shows a eighth embodiment in which the uridome and hose are separated.
Figure 15:
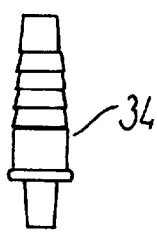
Figure 16:
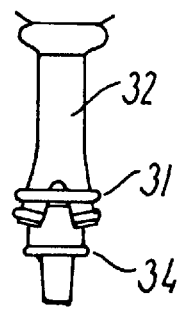
FIG. 16 shows the eighth embodiment in which the uridome and hose are connected.

The pull-off power may also, as shown in FIGS. 15 and 16, be increased by means of a loose elastic tension ring 31 which is positioned in an axially movable manner on the drainage tube part 32 and inserted over the flaps or wall sections 33 after the drainage tube part 32 has been correctly mounted on the hose connector 34.

I claim:

1. An external catheter for remedying male urinary incontinence, comprising a sheath essentially formed as a shaft and a constricted drainage tube part integrated therewith for connection with a hose connector which is connected to a draining hose, characterized in that an end portion of the drainage tube part at the orifice therefore is divided into at least two sections, said sections forming partly cylindrical sections of the wall of the drainage tube part and being separated by means of slits mainly parallel to the axis of the drainage tube part.

2. An external catheter according to claim 1, characterized in that each of said sections is designed with a protruding gripping flange.

3. An external catheter according to claim 1, characterized in that said sections in supply condition are rolled back over the drainage tube part.

4. An external catheter according to claim 3, characterized in that one of said sections is connected with a draw cord.

5. A combination of an external catheter according to claim 1 and a hose connector having a corrugated profiling fitting inside the drainage tube part of the catheter, for connecting the catheter with a draining hose, characterized in that the drainage tube part within said end portion is designed with an internal bead for engagement with the corrugated profiling of the connector.

6. The combination of an external catheter according to claim 1 and a hose connector having a corrugated profiling fitting inside the drainage tube part of the catheter, for connecting the catheter with a draining hose, characterized in that a loose, axially movable elastic tension ring (31) is positioned on the drainage tube part of the catheter.

7. The combination of an external catheter according to claim 1 and a hose connector having a corrugated profiling fitting inside the drainage tube part of the catheter, for connecting the catheter with a draining hose, characterized in that the corrugated profiling of the hose connector is provided with one or more essentially punctual engagement members for engagement in the inside of the drainage tube part of the catheter.

8. The combination according to claim 7, characterized in that said engagement members comprise a number of projections increasing the friction.

9. The combination according to claim 7, characterized in that said engagement members on the hose connector comprise a pin protruding from the connector and that at least one of said wall sections of the catheter is designed with a hole for cooperation with said pin on the hose connector.

* * * * *